Dec. 15, 1942.  O. MEHR  2,305,183
CONVERTIBLE FURNITURE
Filed April 20, 1940   5 Sheets-Sheet 1

INVENTOR
*Otto Mehr*
BY *John F. Ryan*
ATTORNEY

Dec. 15, 1942.　　　O. MEHR　　　2,305,183
CONVERTIBLE FURNITURE
Filed April 20, 1940　　　5 Sheets-Sheet 2

INVENTOR
Otto Mehr
BY John F. Ryan
ATTORNEY

Dec. 15, 1942. O. MEHR 2,305,183
CONVERTIBLE FURNITURE
Filed April 20, 1940 5 Sheets-Sheet 4

INVENTOR
Otto Mehr
BY John F. Ryan
ATTORNEY

Dec. 15, 1942.    O. MEHR    2,305,183
CONVERTIBLE FURNITURE
Filed April 20, 1940    5 Sheets-Sheet 5

INVENTOR
Otto Mehr
BY John F. Ryan
ATTORNEY

Patented Dec. 15, 1942

2,305,183

UNITED STATES PATENT OFFICE 2,305,183

CONVERTIBLE FURNITURE

Otto Mehr, North Bergen, N. J.

Application April 20, 1940, Serial No. 330,738

7 Claims. (Cl. 5—12)

This invention relates to a piece of convertible furniture so designed that it may be readily transformed from one kind to another.

An object of the invention is to produce a piece of furniture which may be converted from a chair into a bed, or a bed into a couch with a minimum of effort, and to produce a device of this kind which has the greatest amount of flexibility and can be converted or transformed into the greatest number of pieces of furniture.

Another object of the invention is to produce a device which can be utilized by a manufacturer of furniture as a frame-work or foundation for various kinds and pieces of furniture upon which to build any one kind which he chooses.

And still another object is to produce a convertible piece of furniture which is light in weight, strong, easy to clean and preferably made entirely of metal, rubber and covering fabric.

A still further object is to produce a device of this kind which is self-contained to the extent that it has suitable space for receiving cushions and vertical upright supporting members when these are not in use.

Figure 1:
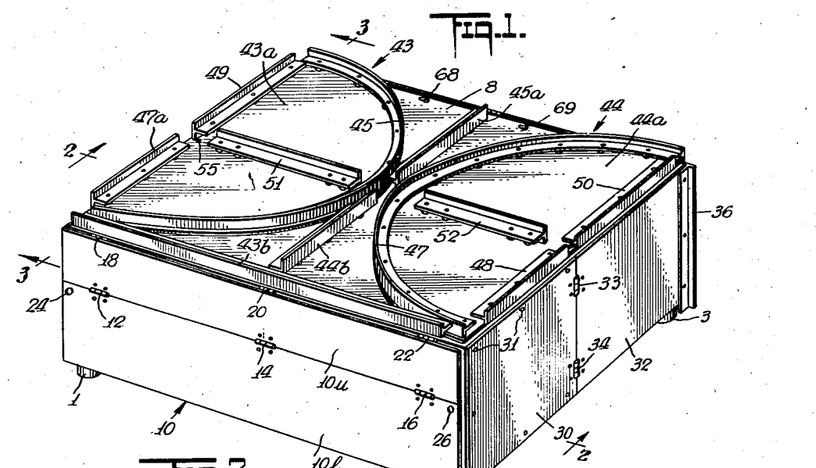
Fig. 1 is a perspective view of the frame-work of the device in its closed position.

Looking at the drawings:

Fig. 1 shows the piece of furniture when in its closed or collapsed position comprising a rectangular box like structure which, as herein shown, is more or less square as viewed from the top, and has a height such that when a cushion, mattress or other piece of upholstery is placed on the top thereof, the top of said cushion or mattress is at normal seat level.

The device is built up on a frame-work comprising four vertical legs shown at 1, 2, 3 and 4. These are designed to rest on the floor and support the weight of the piece of furniture and the occupants thereof. The supporting legs are joined together near the bottom thereof by a rectangular plate 5 with turned down edges as shown at 6, which serve to strengthen the structure, and at the same time, finish off the edge so as to do away with a sharp edge and sharp corners. This plate is preferably placed just above the floor and thus serves to tie the legs rigidly together near the lower ends thereof.

A similar plate of somewhat heavier construction shown at 8, serves to tie the upper ends of the four supporting legs together. Preferably the edges of this plate are also turned downwardly as shown at 9, to increase the structural strength and also improve the appearance and do away with the sharp edge.

Figure 2:
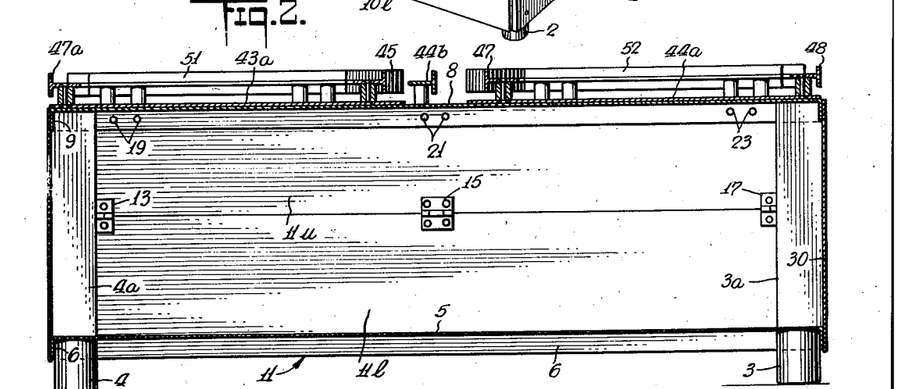
Fig. 2 is a section through 2—2 of Fig. 1.
Figure 3:
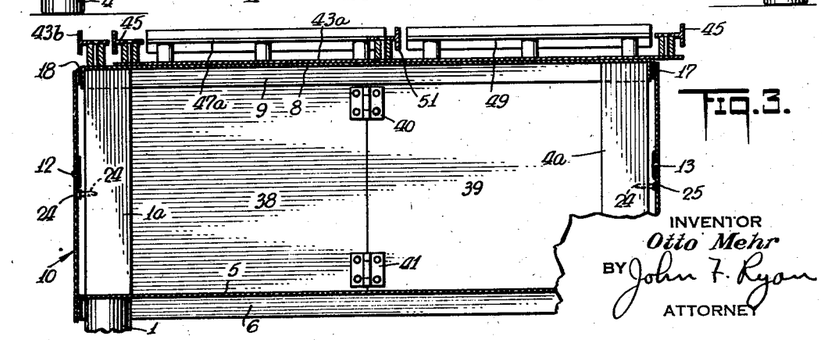
Fig. 3 is a section through 3—3 of Fig. 1.

That portion of the legs 1 to 4 disposed between the plates 5 and 8, are preferably made with a square or rectangular cross-section as shown at 1a, 2a, 3a and 4a. The legs and plates may be tied together with suitable screws, rivets or may be welded together when made of metal. This construction provides not only a strong, light substantial frame-work for the furniture, but as will be more fully described hereinafter, it also provides a storage space between the upper and lower plates. Those portions of the rectangular box like foundation which form the sides shown in Figs. 1 and 2, and which possess a side member having a horizontally disposed division therein, will hereinafter be called the sides of said frame-work and the two other sides will be called the ends. One of these ends is seen in Fig. 3 and it will be noticed that it possesses a vertical division near the mid-point thereof.

Each side of the foundation or supporting frame-work includes a hinged plate shown at 10 and 11. Plates 10 and 11 are made in two sections, 10—u and 10—l, 11—u and 11—l. These are joined together by suitable hinges. Those for plate 10, are shown at 12, 14 and 16. Those for plate 11, are shown at 13, 15 and 17. The upper portions of these plates, that is, 10—u and 11—u are also hinged to the upper plate 8 as shown at 18, 20 and 22 for plate 10—u, and 19, 21 and 23 for plate 11—u.

Figure 4:
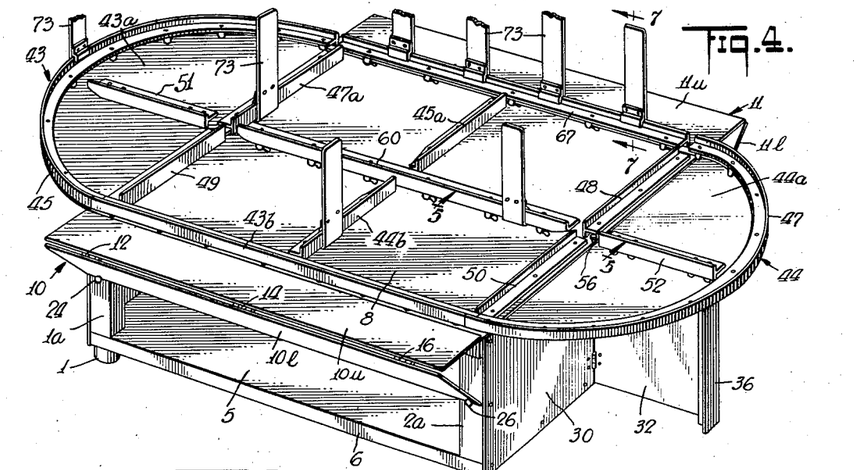
Fig. 4 is a perspective view of the device in an open position showing some of the vertical upright supporting members.

On each leg is positioned a screw lug or other supporting means as shown at 24, 25 and 26. 24 and 26 serve to support the edge of plate 10—l as shown in Fig. 4. A similar pair, of which 25 is one, support the edge of plate 11—l. When the plates 10 and 11 are in their closed position as shown in Figs. 1, 2 and 3, a hole therethrough permits screws 24, 25 and 26 to pass through said plates so that the plates may rest flat against the frame-work. These holes are larger than the heads of the screws and serve no function except to permit the plate to move back flat against the frame-work of the device.

When it is desired to extend the sides of the piece of furniture, the lower edges of plates 10 and 11 may be raised and engaged with the upper part of the screws 24, 25 and 26 to rest thereon as shown in Fig. 4. Plates 10 and 11 are so designed that the upper portions thereof shown at 10—u and 11—u will then form a flat horizontal extension of the upper plate 8 on each side thereof, and the lower portion of these plates shown at 10—l and 11—l will form a rigid support therefor.

The two ends of the structure are closed, each with a pair of plates. One plate of each pair is rigidly secured to the adjoining leg and to the upper and lower plates 5 and 8, whereas, the other plate of each pair is designed to be hinged to the first plate, as will now be described. Looking at that end of the device which is illustrated in Fig. 1, the stationary plate shown at 30, is secured by suitable screws, rivets or the like to the upper and lower plates 5 and 8, and the leg 2 as shown at 31. Hinged to one edge thereof, is another plate 32 which is secured to plate 30 by means of hinges 33 and 34. The outer edge of plate 32 is reinforced with a suitable T member 36 which is extended downwardly at the bottom thereof, so that it rests upon the floor. The corresponding plates for the other end of the device are shown at 38 and 39. Plate 38 is designed to be screwed or otherwise permanently attached to the frame-work of the device. Plate 39 is hinged thereto by means of hinges 40 and 41. Plate 39 is furnished with a reinforcing T member not shown which is of the same design as member 36 and also constructed to rest on the floor.

When the semi-circular end extensions are in their extended positions as shown in Fig. 4, the movable end plates 32 and 39 may be moved out at right angles to the plates 30 and 38 to support these semi-circular extensions. Plate 32 is shown in such extended position in Fig. 4. On the other hand, when the semi-circular extensions are in the position shown in Fig. 1, plates 32 and 39 may be closed as shown in Figs. 1 and 3 and thus the ends of the frame-work may be closed in the same manner as the sides thereof to form an entirely closed box like structure in which suitable storage space may be had for cushions, vertical supporting members and the like, when they are not in use.

The upper surface of plate 8 and the semi-circular extension pieces thereof, which will be hereinafter described more fully, are furnished with T-shaped tracks. Permanently attached to plate 8 are tracks 43b, 44b and 45a. Track 43b extends along one side of the plate 8 as will be seen in Fig. 1. Tracks 44b and 45a are disposed at right angles thereto and extend across the plate 8 substantially at the mid-point thereof from one side to the other.

The useable area of plate 8 may be extended by means of the semi-circular extension pieces 43, and 44. These are made up of flat semi-circular plates 43a and 44a. Around the curved edge of these semi-circular plates is arranged a T-shaped track shown at 45 and 47 respectively. Along the straight edges of the members 43 and 44 are arranged two straight pieces of track shown at 47a and 49 for the member 43, and 48 and 50 for the member 44. At right angles to these and extending substantially centrally of the members 43 and 44 is another T-shaped track 51 for member 43, and 52 for the member 44.

The member 44 is pivoted near its straight edge a little bit off center on the plate 8 as shown at 56, and the member 43 is likewise pivoted at 55. The pivot points are so arranged that when the semi-circular supporting members 43 and 44 are in the open position as shown in Fig. 4, the curved tracks 45 and 47 will engage the ends of the track 43 to make a continuous track as shown in Fig. 4.

When the semi-circular supporting members are in their extended position as shown in Fig. 4, additional tracks may be inserted in the plate 8 as shown in that figure. For instance, the longitudinally and centrally arranged track 60 may be inserted as shown. This can be readily accomplished by means of suitable apertures in the plate 8, the shapes of which consist substantially of the combination of a slot and a circle as shown at 61 in Fig. 6. Attached to the track 60 are a number of cylindrical members, some of which are shown at 63 in Fig. 5 which possess slots therein shown at 64 which will engage the edges of the plate 8 adjacent to the smaller portion of the aperture 61. The track is supported on a number of these members 63 and suitable slots such as 61 are arranged in the plate 8 so that these members 63 can be passed through the larger portions of said slot 61 and then moved into the smaller portions thereof through the use of the slots 64.

A similar track 67 is arranged near the rear side of the plate 8 as viewed in Fig. 4. This likewise is supported on slotted cylindrical members such as member 63 and may be attached to plate 8 in the same manner. Two of the apertures through plate 8 for receiving the members 63 of the track 7 are shown in Fig. 1 at 68 and 69.

When the semi-circular end members 43 and 44 are extended and the auxiliary tracks 60 and 67 installed, the device will look as illustrated in Fig. 4.

Figure 5:
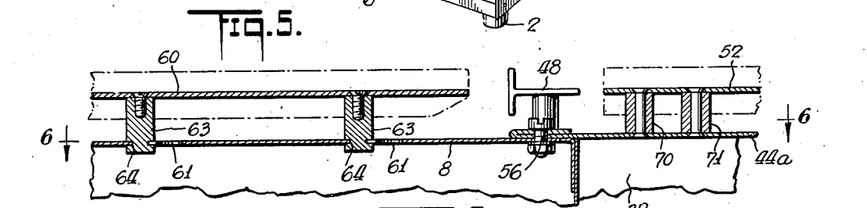
Fig. 5 is a section through 5—5 of Fig. 4.
Figure 6:
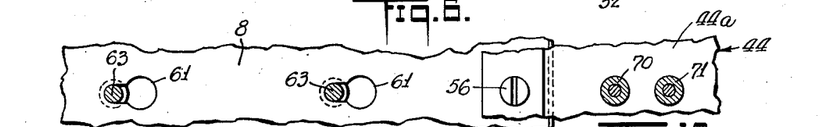
Fig. 6 is a section through 6—6 of Fig. 5.
Figure 7:
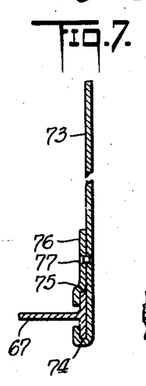
Fig. 7 is a section through 7—7 of Fig. 4.
Figure 8:
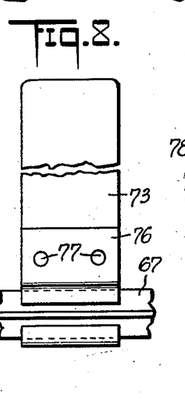
Fig. 8 is a side elevation of one of the vertical supporting members.

The permanently attached tracks may be secured to the plate 8 by means of hollow rivets such as those shown in section at 70 and 71 of Fig. 5. A solid rivet or bolt through a spacing cylinder can be used. These serve to hold the tracks on plate 8 but spaced therefrom, as shown in the various figures and for a purpose which will be made clearer hereinafter when the vertical supporting surfaces are described.

The vertical supporting surfaces are illustrated in Figs. 4, 7, 8, 9 and 10. They comprise a number of metal strips adapted to be secured to the tracks heretofore described and adapted to slide along said tracks so that they may be positioned any place thereon. Each strip consists of a vertical member 73. The lower end of which is bent under to form a U-shaped groove as shown at 74, which groove is adapted to engage and slide along the lower edge of the tracks. A similar cooperating groove 75 is formed by means of an off-set member 76 riveted or otherwise secured to member 73 as shown at 77. The track is engaged in the grooves 74 and 75 and the vertical supporting member may be slid along the tracks to any desired position.

Figure 9:
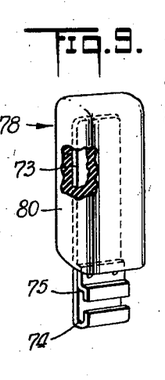
Fig. 9 is a perspective view of a single vertical supporting member showing a piece of upholstery thereon.
Figure 10:
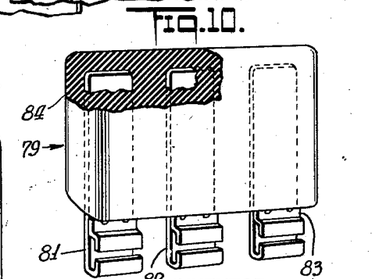
Fig. 10 is a perspective view of three vertical members with a single piece of upholstery thereon.

Fig. 9 shows vertical supporting member 78 equipped with a piece of upholstery shown at 80. This is designed with a recess on the interior thereof to receive the supporting member and especially strip 73 thereof. The upholstery may be made up to receive more than one strip as shown in 79 of Fig. 10. There is shown three vertical supporting members 81, 82 and 83, the upper ends of which are enclosed in the upholstery member 84. A single upholstery member may be designed to cover any number of vertical supporting strips depending upon the piece of furniture it is desired to construct, or a continuous supporting surface may be made up of single upholstered strips.

Figure 11:
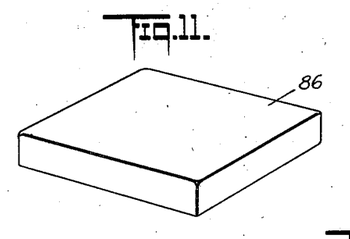
Fig. 11 is a perspective view of a piece of upholstery adapted to cover the main horizontal supporting surface such as that shown in Fig. 1.
Figure 12:
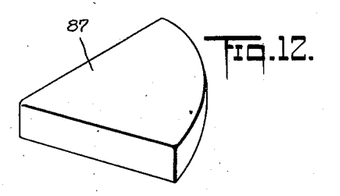
Fig. 12 is a perspective view of a piece of upholstery designed to cover one-half of the semi-circular extension pieces.
Figure 13:
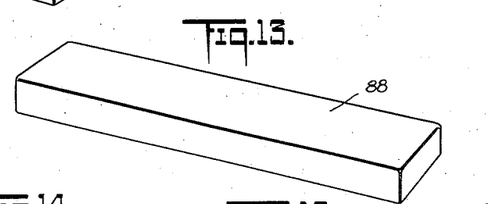
Fig. 13 is a perspective view of a piece of upholstery designed to cover the side extension pieces shown in raised position in Fig. 4.

In Figs. 11, 12 and 13 are shown upholstery shapes or forms 86, 87 and 88 for horizontal supporting surfaces. That shown in Fig. 11 is designed to cover substantially one-quarter of the horizontal supporting area of the device when it is in its closed position as shown in Fig. 1.

Form 87 illustrated in Fig. 12 is designed to cover one-half of the semi-circular extension numbers 43 and 44. Form 88 illustrated in Fig. 13 is designed to cover the side extensions 10—u and 11—u.

It has been found that rubber upholstery suitably covered with any desired fabric, lends itself particularly well to a structure of this kind, inasmuch as no springs or similar devices are required and because the various pieces can be more readily moved around from one position to another and inserted in place. Sponge rubber or that form of rubber which is sold under trademark "Airfoam" may be used.

Figures 14, 15, 16, 17, 18, 19, 20, 21:
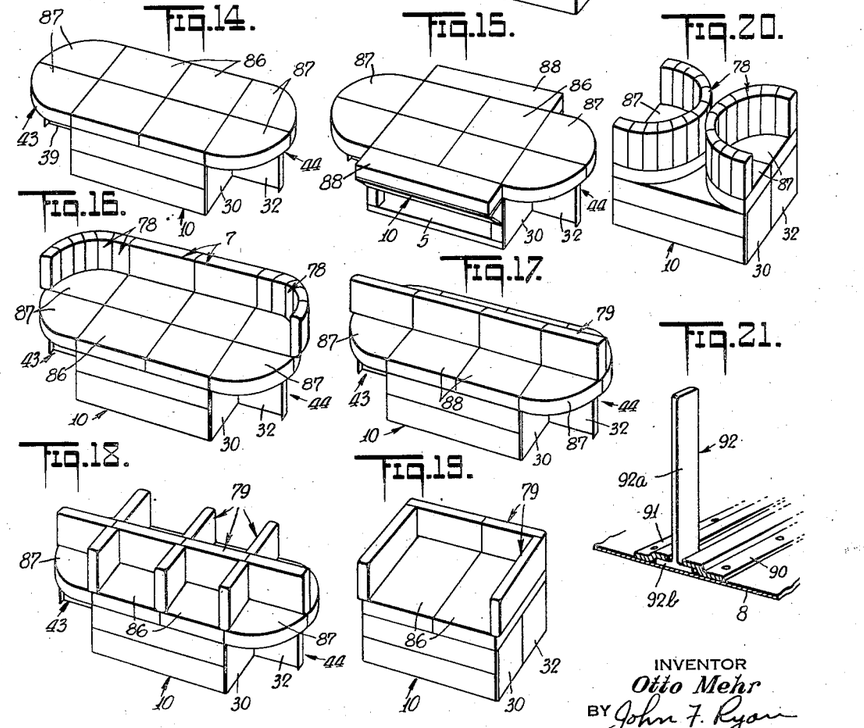
Figs. 14 to 20, inclusive, are diagrammatic sketches in perspective illustrating various arrangements of the device to form different designs and pieces of furniture.
Fig. 21 is a perspective view of a modification of the supporting track used to secure the vertical supporting surfaces to the horizontal supporting surfaces.

In Fig. 21 as illustrated, another embodiment or form of track which can be utilized and which consists of a pair of off-set strips 90 and 91 riveted to plate 8 as shown in the figure and which between them form a slot or groove adapted to receive a T shaped vertical member shown at 92. This consists of a vertical portion 92a and the right angularly disposed portion 92b, which is engaged between the strips 90 and 91.

Figure 22:
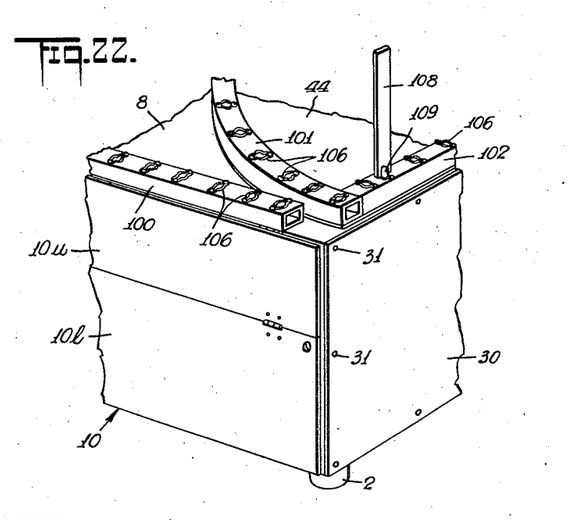
Fig. 22 is a perspective view of another modification of the invention.
Figure 23:
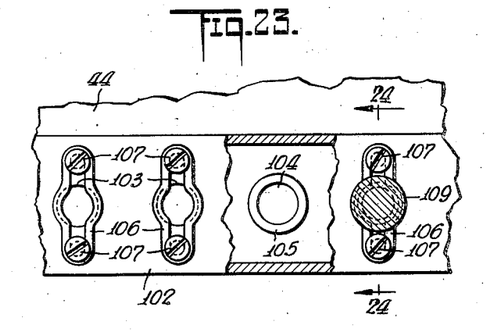
Fig. 23 is a plan view of part of the horizontal surface of the device shown in Fig. 22.
Figure 24:
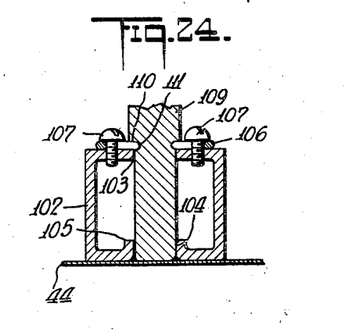
Fig. 24 is a section through 24—24 of Fig. 23.

Another embodiment of the invention or modification thereof, is shown in Figs. 22, 23 and 24. In these figures the same numerals will be used to designate parts which are the same as heretofore described and illustrated in other figures.

The horizontal supporting plate is shown at 8. One of the legs supporting this plate is shown at 2, and the stationary end plate is shown at 30. Means such as screws or rivets 31, secure this plate to the frame-work. The hinged side plate is shown at 10 with its lower portion 10—l and its upper portion 10—u. On the plate 8 is shown the pivoted semi-circular extension piece 44.

This embodiment of the invention discloses perforated re-enforcing strips in place of the tracks shown in the previous figures. One of these strips attached to the plate 8 is shown at 100. Another one of these strips attached to the edge of the semi-circular extension plate 44 is shown at 101, and still another strip attached to the straight edge of plate 44 is shown at 102. These strips as illustrated, are hollow with a square or rectangular cross-section as best seen in Fig. 24. They may be riveted, welded, screwed or otherwise secured to the supporting surfaces 8 and 44.

Each strip is furnished with a series of pairs of holes therethrough. Each pair consists of an upper perforation or hole as shown at 103, and a lower perforation as shown at 104. The edges of the hole 104 are preferably turned upward as shown at 105 to increase the area of the supporting surface. On the upper side of the re-enforcing strips 100, 101 and 102, and adjacent to each of the holes 103, is a spring clip 106 which can be made of a continuous piece of spring wire in the shape shown in Fig. 23. The central portion of this spring clip 106 follows the general curve of the edge of the hole 103. The two ends of the clip can be secured to the re-enforcing strip by suitable screws 107.

The re-enforcing strips are designed to receive prongs 109 attached to the vertical supporting surfaces 108. Prong or pin 109 is circular in cross-section, and its lower diameter is such that it can just fit through the holes 103 and 104, whereas, the diameter above the hole 103 (Fig. 24) is slightly increased at 110 to produce an off-set on the under side of which is formed a circular groove around the pin or prong. When the prong is forced down through holes 103 and 104, the spring clip 106 is sufficiently resilient to spread apart to permit the prong to move through the hole 103 into the hole 104 and when the prong has moved all the way down, the circular groove 111 is designed to receive the spring clip 106 so that the latter will hold the prong or pin from being readily lifted or otherwise disengaged from the re-enforcing strip. The prong or pin can be readily removed from the re-enforcing strip by lifting it through the spring clip 106. The collar 105, serves to embrace the lower end of the pin and to hold it securely in place.

Figs. 25 to 33, inclusive, illustrate means for using vertical supporting members which may be inserted in suitable openings in the horizontal supporting surface, and the device is so arranged that the horizontal supporting surface will form a substantially flat uninterrupted surface.

Figure 25:
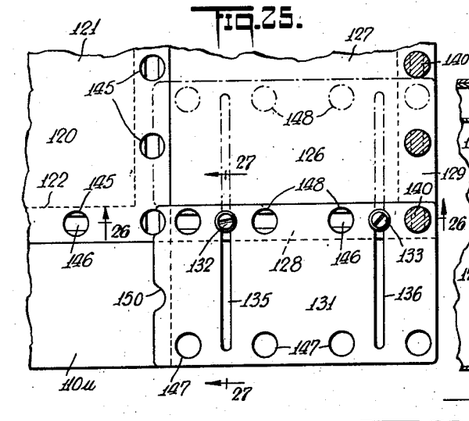
Fig. 25 is a plan view of another embodiment of the invention.

Fig. 25 is a fragmentary plan view of a piece of convertible furniture wherein the main horizontal supporting surface is shown at 120. This comprises a metal sheet 121 supported on a suitable supporting frame-work consisting of tubes 122 of square cross-section arranged along the outer edges of sheet 121, which tubes in turn are supported by legs 123. These legs are tied together near the bottom thereof by a sheet of metal 124 which imparts strength and rigidity to the structure and forms a bottom for the compartment under surface 120.

Figure 27:
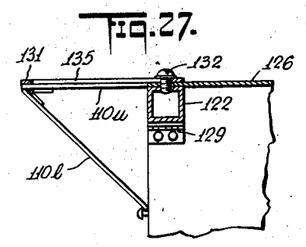
Fig. 27 is a section through 27—27 of Fig. 25.

Side members 110—u and 110—l are the same as the corresponding members 10—u and 10—l and are so designed as to form an extension of the horizontal supporting surface 120 when raised as illustrated in Fig. 27, or form a side wall for the lower part of the piece of convertible furniture when dropped into their lowered position. They function like 10—u and 10—l heretofore described and illustrated. To extend the ends of the main body portion 120, the embodiment illustrated in these figures includes a hinged portion 126 which includes an upper flat plate 127 and square tubular members 128 and 129 disposed around the edges of said plate 127. Extendable member 126 is hinged to one end of the main body portion 120 by means of two or more hinges one of which is shown at 129. A pair of collapsible arms serve to support this extension when in its raised position. One of these arms is shown at 130. On the upper side of member 126 at the ends thereof, is an extension plate 131 disposed on top of plate 127. This plate is designed to slide on top of plate 127 and is guided by a pair of screws 132 and 133 secured into plate 127 and the square tubular member 128 and designed to cooperate with slots 135 and 136 in plate 131 to guide it so that it may be moved outwardly from the ends of member 126 to form an extension thereof and of member 110—u as shown in Fig. 25.

Plate 131 when in its extended position as shown in Fig. 25, is supported on members 126, 110—u and to some extent on member 120. It is held in position by screws 132 and 133.

Around the edges of member 120 and 126 are secured square tubular re-enforcing members underneath the plates which form the top of these portions of the piece of furniture. Vertical supporting members are designed to pass through holes in the upper plates and into suitable slots in the lower portion of the square tubular members, so as to be held firmly in position.

Figure 26:
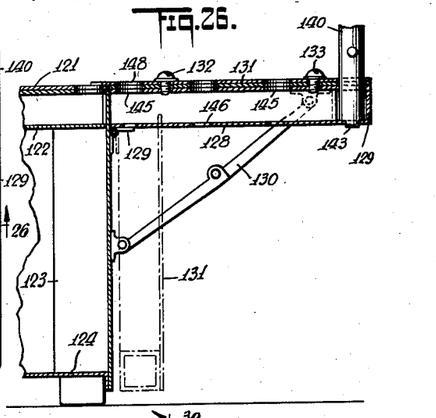
Fig. 26 is a section through 26—26 of Fig. 25.
Figure 28:
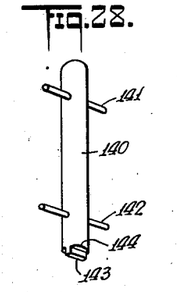
Fig. 28 is a perspective view of vertical supporting members which can be used with the structure illustrated in Figs. 25 and 26.

In Figs. 25 and 26, is illustrated a square tubular member designed to receive vertical supporting members such as that shown in Fig. 28. Such a member comprises a cylindrical pin 140 equipped with a pair of cross-pins of smaller diameter shown at 141 and 142. The lower end of pin 140 is ground off to form a shoulder 144 with a thin projecting portion of more or less rectangular cross-section as shown at 143.

Such a vertical supporting member is designed to be inserted in holes drilled through plates 121 and 127 and through the upper surfaces of the rectangular members so that the portion 143 of each pin may be slipped into suitable slots cut in the lower portion of the square tubular members. Some of the round holes through the plates 121 and 127 are shown at 145. Within the circular holes cut in the upper surfaces may be seen the rectangular slot such as that shown at 146 which is cut in the lower surface of the square tube. Circular holes 147 and 148 are drilled through the plate 131. When the plate is in the extended position shown in Fig. 25, the holes 148 will be immediately above the corresponding holes 145 in member 126. When the plate is in its retracted position as shown in dotted lines, the drilled holes 147 will be above holes 145. Whether the extension 131 is in its extended or retracted position, the vertical pins 140 can be inserted or withdrawn. Suitable notches in member 131, one of which is shown at 150, permit the use of holes 145 in member 120 whether the plate 131 is in its extended or retracted position.

The square tubular members 122 and 128 furnish a means for supporting the vertical supporting members so that greater strength and rigidity is obtained. They also serve as a frame-work for the members 120 and 126 to support the same and at the same time to attach the legs 123 and the side members of the device.

Figure 29:
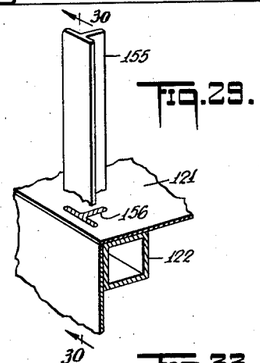
Fig. 29 is a perspective view partly in section illustrating the supporting means for a T type of vertical support.

In Fig. 29 is shown a fragmentary section of member 121 including a T-type vertical supporting member shown at 155. A T-shaped opening 156 is cut through the plate 121 and the top of square tube 122 so that member 155 may be passed therethrough. What might be termed the top of the T or that surface which forms the top of the T is somewhat longer than the surface which forms the vertical portion of the T. That is, the surface 155a (Fig. 30) is cut so that it is somewhat longer than the surface 155b. The elongated portion 155m is designed to slip into a slot cut in the bottom of the square tubular member 122.

Figure 30:
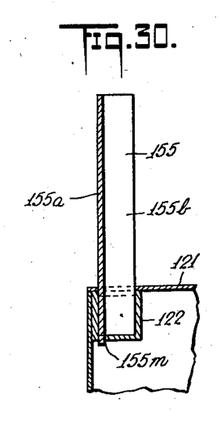
Fig. 30 is a section through 30—30 of Fig. 29.
Figure 31:
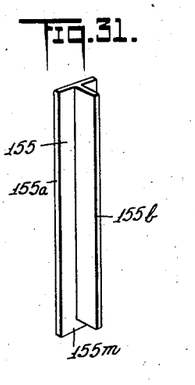
Fig. 31 is a perspective view of a T type of vertical supporting member.
Figure 32:
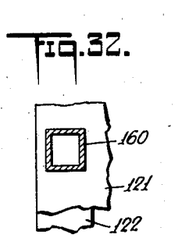
Fig. 32 is a plan view of an opening in the horizontal supporting surface for receiving a vertical supporting member of square cross-section.
Figure 33:
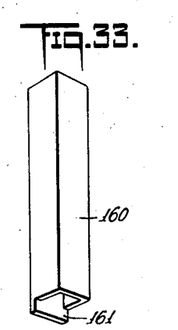
Fig. 33 is a perspective view of a vertical supporting member of square cross-section.

Another type of vertical support made from a square tube is shown at Figs. 32 and 33. Fig. 32 shows such a square member 160 inserted in a square hole or aperture through plate 121 and the upper portion of square tube 122. The lower portion of tube 122 is slotted in substantially the same manner as is shown in Fig. 30. One side of the vertical supporting member which is shown at 160, is somewhat longer at the bottom than the other three sides. This lip or extended portion is shown at 161 and is designed to be inserted in the slot in the lower portion of the square tubular member 122.

The advantages of the embodiments shown in Figs. 25 to 33 inclusive, are that the upper surfaces are substantially flat and clear of any projections. The vertical supporting surfaces can be erected merely by inserting them in suitable apertures in the horizontal supporting surfaces. The construction is both simple and strong.

In order to construct any one of the large number of designs or pieces of furniture, the required number of vertical supporting surfaces may be secured and erected thereon. With this construction, vertical supporting surfaces cannot be moved along the re-enforcing strips but there are a sufficient number of holes or perforations in the strips to permit a great variety of positions and combinations.

Figs. 14 to 19, inclusive, illustrate some of the forms of furniture which can be readily made up with a device of this kind. In Fig. 14 is shown a single bed which is made by extending the semi-circular members 43 and 44 with their supporting plates 32 and 39. Four cushions or mattresses like that shown at 86 in Fig. 11 will serve to cover the rectangular central portion of the bed and four segmentary cushions or mattresses like that shown at 87 of Fig. 12 will serve to cover the semi-circular extensions.

If the side plates 10 and 11 are put in their raised position as shown in Fig. 4, these additional surfaces may be covered by a rectangular mattress or cushion such as 88 shown in Fig. 13, making a double bed as illustrated in Fig. 15.

If it is desired to form a sofa, the single bed arrangement such as that shown in Fig. 14 may be furnished with a back by erecting a suitable number of vertical supporting members such as 78 and 79 along either track 43a or track 67, and additional members along tracks 45 and 47 to produce the form and shape illustrated in Fig. 16.

In Fig. 17 is illustrated a settee with a single vertical supporting surface extending longitudinally of the structure to form two rows of seats, one on each side of the back or vertical supporting surfaces. Here again we start out with a piece of furniture extended as shown in Fig. 14 and then vertical supporting members such as 79 are arranged along the tracks 60, 51 and 52.

Fig. 18 shows a settee with four individual seats on each side of the back supporting surfaces. This may be constructed by adding to what is shown in Fig. 17, vertical supporting members or surfaces 79 on tracks 44b, 45a, 47a, 48, 49 and 50.

Fig. 19 illustrates a love-seat which may be made by arranging the structure in its closed position as shown in Fig. 1, and then erecting vertical supporting surfaces 78 or 79 on tracks 43b, 47a, 48, 49 and 50.

In Fig. 20 is illustrated a back to back seat which may be constructed by arranging the device in its closed position as shown in Fig. 1 and then erecting vertical supporting surfaces 78 on the curved tracks 45 and 47.

The space between the plates 5 and 8 may be utilized to house spare cushions and vertical supporting members when they are not in use. The structure may be designed to be changed from one form to another by the user, or may be used by the manufacturer of furniture who utilizes the metal frame-work to build up pieces of furniture of different shapes and forms.

The rubber type of cushion is sufficiently flexible to accommodate itself to the irregularities of the supporting surfaces due to the presence of the tracks so that when such cushions are placed thereon, the presence of the tracks cause no discomfort to the occupant of the piece of furniture. That type of track illustrated at Fig. 21 has the advantage of projecting only a very small distance above the horizontal supporting surface and may be used, if so desired, in place of the higher tracks illustrated in the other figures.

The general dimensions of the structure may be varied to suit the particular needs of the occasion, and the shapes and proportions illustrated in the drawings are merely used to show the general principles of the invention. Various other shapes and arrangements may be devised other than those specifically illustrated in Figs. 14 to 20, inclusive. For instance, the horizontal supporting surfaces of the back to back seat in Fig. 20 may be extended outwardly to support the legs of the occupant to form a pair of ottomans, or one of the ends of the beds shown in Figs. 14 and 15 may be enclosed by vertical supporting members to form a crib. The arrangements shown in these figures are merely illustrative and should not be construed as limitations on the number of arrangements which may be devised.

I wish it to be understood that I do not limit myself to the exact details of construction shown and described, as my invention is obviously capable of various modifications.

Having thus described my invention what I claim as new and desire to secure by Letters Patent is:

1. A convertible piece of furniture comprising a supporting framework, a horizontal supporting surface on said framework, vertical supporting surfaces, pivoted auxiliary surfaces for extending and enlarging said horizontal supporting surface, means for detachably securing said vertical supporting surfaces in different positions on said horizontal surface and the extensions thereof to formg different shapes, forms and pieces of furniture.

2. In a convertible piece of furniture, a supporting framework, a horizontal supporting surface on said framework, pivoted auxiliary surfaces for extending said horizontal supporting surface, tracks on said horizontal supporting surface and the extensions thereof, vertical supporting surfaces and means for attaching said vertical supporting surfaces to said tracks in any position along the length thereof to form different shapes, and pieces of furniture.

3. In a convertible piece of furniture, a supporting framework comprising vertical legs and cross braces, a substantially rectangular horizontal supporting surface on said framework, semi-circular supporting surfaces disposed at opposite ends of said rectangular horizontal supporting surface and pivoted near the edges thereof so as to swing out and form an extension of said horizontal supporting surface, vertical supporting surfaces and means for detachably securing said vertical supporting surfaces on said horizontal supporting surfaces at different positions thereon to form different shapes and pieces of furniture.

4. In a convertible piece of furniture, a substantially rectangular horizontal supporting surface, a frame-work supporting said surface and an enclosure around said frame-work to form a closed space under said surface, means for raising the sides of said enclosure to form side extensions of said horizontal supporting surface on opposite sides thereof, pivoted means for extending the ends of said horizontal surface, tracks on said horizontal supporting surface and the end extensions thereof, vertical supporting surfaces and means for attaching them to said tracks so that they may be moved thereon to form different shapes and pieces of furniture.

5. In a convertible piece of furniture, a substantially horizontal supporting surface, a supporting framework therefor, semi-circular pivoted means for extending said horizontal surface on each end thereof, and tracks on said horizontal supporting surface and the end extensions thereof adapted to receive vertical supporting surfaces thereon in any position on said tracks.

6. In a convertible piece of furniture, a horizontal supporting surface, a supporting framework therefor, pivoted means for extending the area of said surface, perforations in said horizontal supporting surface and the extension thereof, vertical supporting surfaces and prongs attached thereto adapted to fit into said perforations to support said vertical supporting surfaces on said horizontal surfaces.

7. In a convertible piece of furniture, a substantially rectangular horizontal supporting surface, a framework supporting said surface, an enclosure around said framework to form a closed space under said surface, means for raising the sides of said enclosure to form an extension of said horizontal supporting surface on opposite sides thereof, semi-circular supporting surfaces disposed at opposite ends of said rectangular horizontal supporting surface and pivoted near the edges thereof so as to swing out and form an extension of said horizontal supporting surface, plates forming part of said enclosure around said framework adapted to be positioned under said semi-circular supporting surfaces when they are in their extended position to aid in supporting them, vertical supporting surfaces adapted to cooperate with said horizontal supporting surface and the semi-circular extensions therefor, and means for connecting said vertical supporting surfaces to be erected on said horizontal surface and said semi-circular extensions thereof in any one of a plurality of different places.

OTTO MEHR.